US008930197B2

(12) United States Patent
Ramo et al.

(10) Patent No.: US 8,930,197 B2
(45) Date of Patent: Jan. 6, 2015

(54) APPARATUS AND METHOD FOR ENCODING AND REPRODUCTION OF SPEECH AND AUDIO SIGNALS

(75) Inventors: Anssi Ramo, Tampere (FI); Mikko Tammi, Tampere (FI); Adriana Vasilache, Tampere (FI); Lasse Laaksonen, Nokia (FI)

(73) Assignee: Nokia Corporation, Espoo (FI)

( * ) Notice: Subject to any disclaimer, the term of this patent is extended or adjusted under 35 U.S.C. 154(b) by 677 days.

(21) Appl. No.: 12/991,895

(22) PCT Filed: May 9, 2008

(86) PCT No.: PCT/EP2008/055776
§ 371 (c)(1),
(2), (4) Date: Nov. 9, 2010

(87) PCT Pub. No.: WO2009/135532
PCT Pub. Date: Nov. 12, 2009

(65) Prior Publication Data
US 2011/0093276 A1 Apr. 21, 2011

(51) Int. Cl.

| | |
|---|---|
| ***G10L 19/12*** | (2013.01) |
| ***G10L 19/008*** | (2013.01) |
| *G10L 21/02* | (2013.01) |
| *G10L 21/04* | (2013.01) |
| *G10K 11/16* | (2006.01) |
| *H04R 3/00* | (2006.01) |
| *H04R 5/02* | (2006.01) |
| *H04R 5/00* | (2006.01) |
| *H04N 7/12* | (2006.01) |
| *H04W 72/00* | (2009.01) |
| *H04M 1/00* | (2006.01) |

(52) U.S. Cl.
CPC .................................... *G10L 19/008* (2013.01)
USPC ........... 704/500; 704/221; 704/503; 704/227; 704/201; 704/219; 381/71.6; 381/92; 381/310; 381/22; 381/23; 375/240.13; 455/450; 455/550.1

(58) Field of Classification Search
USPC ................. 704/500, 221, 503, 227, 201, 219; 381/71.6, 92, 310, 22, 23; 717/137; 455/550.1, 450; 375/240.13
See application file for complete search history.

(56) References Cited

U.S. PATENT DOCUMENTS

| | | | | |
|---|---|---|---|---|
| 6,137,887 | A | 10/2000 | Anderson | |
| 6,529,604 | B1 * | 3/2003 | Park et al. | 381/22 |
| 7,885,819 | B2 * | 2/2011 | Koishida et al. | 704/500 |
| 8,180,061 | B2 * | 5/2012 | Hilpert et al. | 381/22 |

(Continued)

FOREIGN PATENT DOCUMENTS

| | | |
|---|---|---|
| EP | 1536414 | 6/2005 |

OTHER PUBLICATIONS

Office Action received in corresponding Chinese Application No. 20880129096.4, Dated Dec. 23, 2011, 10 pages.

(Continued)

*Primary Examiner* — Paras D Shah
*Assistant Examiner* — Neeraj Sharma
(74) *Attorney, Agent, or Firm* — Alston & Bird LLP

(57) ABSTRACT

A method comprising receiving at a user equipment encrypted content. The content is stored in said user equipment in an encrypted form. At least one key for decryption of said stored encrypted content is stored in the user equipment.

20 Claims, 7 Drawing Sheets

(56) References Cited

U.S. PATENT DOCUMENTS

| | | | | |
|---|---|---|---|---|
| 8,306,827 | B2 * | 11/2012 | Yamanashi et al. | 704/500 |
| 8,498,422 | B2 * | 7/2013 | Oomen et al. | 381/23 |
| 2005/0177360 | A1 * | 8/2005 | Schuijers et al. | 704/201 |
| 2006/0009225 | A1 * | 1/2006 | Herre et al. | 455/450 |
| 2006/0120537 | A1 * | 6/2006 | Burnett et al. | 381/71.6 |
| 2006/0262943 | A1 * | 11/2006 | Oxford | 381/92 |
| 2007/0025562 | A1 * | 2/2007 | Zalewski et al. | 381/92 |
| 2007/0154031 | A1 | 7/2007 | Avendano et al. | |
| 2007/0274383 | A1 | 11/2007 | Yu et al. | |
| 2008/0004883 | A1 * | 1/2008 | Vilermo et al. | 704/500 |
| 2008/0052066 | A1 * | 2/2008 | Oshikiri et al. | 704/221 |
| 2008/0064336 | A1 | 3/2008 | Yoo | |
| 2008/0152006 | A1 * | 6/2008 | Chen et al. | 375/240.13 |
| 2008/0195397 | A1 * | 8/2008 | Myburg et al. | 704/500 |
| 2008/0201138 | A1 * | 8/2008 | Visser et al. | 704/227 |
| 2009/0030677 | A1 * | 1/2009 | Yoshida | 704/219 |
| 2009/0111507 | A1 * | 4/2009 | Chen | 455/550.1 |

OTHER PUBLICATIONS

Office Action received in corresponding Korean Application No. 2010-7025041, Dated Jan. 31, 2012, 10 pages.

"G.729-based embedded variable bit-rate coder: An 8-32 kbit/s scalable wideband coder bitstream interoperable with G.729", Series G: Transmission Systems and Media, Digital Systems and Networks, Digital terminal equipments—Coding of analogue signals by methods other than PCM, ITU-T Recommendation G.729.1, May 2006, 100 pages.

"Low-complexity coding at 24 and 32 kbit/s for hands-free operation in systems with low frame loss", Series G: Transmission Systems and Media, Digital Systems and Networks, Digital terminal equipments—Coding of analogue signals by methods other than PCM, ITU-T Recommendation G.722.1, May 2005, pp. 36.

"From ITU-T G.722.1 to ITU-T G.722.1 Annex C: A New Low-Complexity 14kHz Bandwidth Audio Coding Standard", Journal of Multimedia, vol. 2, No. 2, Apr. 2007, pp. 65-76.

"Coding of speech at 8 kbit/s using conjugate-structure algebraic-code-excited linear prediction (CS-ACELP)", Series G: Transmission Systems and Media, Digital Systems and Networks, Digital terminal equipments—Coding of analogue signals by methods other than PCM, ITU-T Recommendation G.729, Jan. 2007, 146 pages.

International Search Report and Written Opinion received for corresponding Patent Cooperation Treaty Application No. PCT/EP2008/055776, dated Dec. 23, 2008, 14 pages.

Faller et al., "Binaural Cue Coding—Part II: Schemes and Applications", IEEE transactions on Speech and Audio Processing, vol. 11, No. 6, Nov. 2003, pp. 520-531.

Office Action received for corresponding Russian Patent Application No. 2010149667, dated Apr. 20, 2012, 6 pages of Office Action and 4 pages of Office Action translation.

Final Office Action received for corresponding Korean Patent Application No. 2010-7025041, dated Oct. 31, 2012, 4 pages, No English Language Translation available.

Van Der Waal et al., "Subband coding of stereophonic digital audio signals", International Conference on Acoustics, Speech, and Signal Processing, vol. 5, Apr. 14-17, 1991, pp. 3601-3604.

Office Action received for corresponding Canadian Application No. 2721702, dated Mar. 7, 2013, 4 pages.

Office Action received for corresponding Chinese Application No. 200880129096.4, dated Oct. 8, 2012, 12 pages.

Yanli Zheng et al. "Air-and Bone-Conductive Integrated Microphones for Robust Speech Detection and Enhancement",Automatcif Speech Recognition and Understanding, 2003. ASRU'03.2003 TEEE Workshop, Dec. 3, 2003.

Ragot, S. et al. "ITU-T G.729.1:An 8-32 Kbits/S scalable Coder Intereperable with G.729 for Wideband Telephony and voice over IP", Acoustics, Speech and Signal Processing, 2007. ICASSP2007. IEEE International Conference, vol. 4.

Office Action received for corresponding Korean Application No. 2010-7025041, dated Feb. 4, 2013, 6 pages.

Office Action for Canadian Application No. 2,721,702 dated Feb. 24, 2014.

* cited by examiner

APPARATUS AND METHOD FOR ENCODING AND REPRODUCTION OF SPEECH AND AUDIO SIGNALS

RELATED APPLICATION

This application was originally filed as PCT Application No. PCT/EP2008/055776 filed on May 9, 2008, which is incorporated herein by reference in its entirety.

FIELD OF THE INVENTION

The present invention relates to apparatus and method for audio encoding and reproduction, and in particular, but not exclusively to apparatus for encoded speech and audio signals.

BACKGROUND OF THE INVENTION

Audio signals, like speech or music, are encoded for example for enabling an efficient transmission or storage of the audio signals.

Audio encoders and decoders are used to represent audio based signals, such as music and background noise. These types of coders typically do not utilise a speech model for the coding process, rather they use processes for representing all types of audio signals, including speech.

Speech encoders and decoders (codecs) are usually optimised for speech signals, and can operate at either a fixed or variable bit rate.

An audio codec can also be configured to operate with varying bit rates. At lower bit rates, such an audio codec may work with speech signals at a coding rate equivalent to a pure speech codec. At higher bit rates, the audio codec may code any signal including music, background noise and speech, with higher quality and performance.

In some audio codecs the input signal is divided into a limited number of bands. Each of the band signals may be quantized. From the theory of psychoacoustics it is known that the highest frequencies in the spectrum are perceptually less important than the low frequencies. This in some audio codecs is reflected by a bit allocation where fewer bits are allocated to high frequency signals than low frequency signals.

One emerging trend in the field of media coding are so-called layered codecs, for example ITU-T Embedded Variable Bit-Rate (EV-VBR) speech/audio codec and ITU-T Scalable Video Codec (SVC). The scalable media data consists of a core layer, which is always needed to enable reconstruction in the receiving end, and one or several enhancement layers that can be used to provide added value to the reconstructed media (e.g. improved media quality or increased robustness against transmission errors, etc).

The scalability of these codecs may be used in a transmission level e.g. for controlling the network capacity or shaping a multicast media stream to facilitate operation with participants behind access links of different bandwidth. In an application level the scalability may be used for controlling such variables as computational complexity, encoding delay, or desired quality level. Note that whilst in some scenarios the scalability can be applied at the transmitting end-point, there are also operating scenarios where it is more suitable that an intermediate network element is able to perform the scaling.

A majority of real time speech coding is with regards to mono signals, but for some high end video and audio teleconferencing systems, stereo encoding has been used to produce better speech reproduction experience for the listener. Traditional stereo speech encoding involves the encoding of separate left and right channels, which position the source to some location in the auditory scene. Commonly used stereo encoding for speech is binaural encoding, where the audio source (such as a voice of a speaker) is detected by two microphones which are located on a simulated reference head left and right ear position.

Encoding and transmission (or storage) of the left and right microphone generated signals requires more transmission bandwidth and computation since there are more signals to encode and decode than a conventional mono audio source recording. One approach to reduce the amount of transmission (storage) bandwidth used in stereo encoding methods is to require the encoder to mix both the left and right channels together and then encode the constructed (combined) mono signal as a core layer. The information on the left and right channel differences may then be encoded as a separate bit stream or enhancement layer. This type of encoding however produces a mono signal at the decoder with a sound quality worse than traditional encoding of a mono signal from a single microphone (located for example near the mouth) as the two microphone signals combined together receive much more background or environmental noise than a single microphone located near the audio source (for example the mouth). This makes the backwards compatible ‘mono’ output quality using legacy playback equipment worse than the original mono recording and mono playback process.

Furthermore the binaural stereo microphone placement where the microphones are located at simulated ear positions on a simulated head may produce an audio signal disturbing for the listener especially when the audio source moves rapidly or suddenly. For example, in an arrangement where the microphone placement is near the source, a speaker, poor quality listening experiences may be generated simply when the speaker rotates their head causing a dramatic and wrenching switch in left and right output signals.

SUMMARY OF THE INVENTION

This application proposes a mechanism that facilitates efficient stereo image reproduction for such environments as conference activities and mobile user equipment use.

Embodiments of the present invention aim to address or at least partially mitigate the above problem.

There is provided according to a first aspect of the invention an apparatus for encoding an audio signal configured to: generate a first audio signal comprising a greater portion of audio components from an audio source; and generate a second audio signal comprising a lesser portion of audio components from the audio source.

Thus in embodiments of the invention the greater portion of the audio components may be encoded using different methods or use different parameters than the second audio signal comprising the lesser portion of the audio components from the audio source and thus the greater portion of the audio signal more optimally encoded.

The apparatus may be further configured to: receive the greater portion of the audio components from the audio source from at least one microphone located or directed towards the audio source; and receive the lesser portion of the audio components from the audio source from at least one further microphone located or directed away from the audio source.

The apparatus may be further configured to: generate a first scalable encoded signal layer from the first audio signal; generate a second scalable encoded signal layer from the second audio signal; and combine the first and second scalable encoded signal layers to form a third scalable encoded signal layer Thus in embodiments of the invention it is possible to encode the signal in an apparatus whereby the signal is recorded as at least two audio signals and the signals individually encoded so the encoding for each of the at least two audio signals may use different encoding methods or parameters to more optimally represent the audio signal.

The apparatus may be further configured to generate the first scalable encoded layer by at least one of: advanced audio coding (AAC); MPEG-1 layer 3 (MP3), ITU-T embedded variable rate (EV-VBR) speech coding base line coding; adaptive multi rate-wide band (AMR-WB) coding; ITU-T G.729.1 (G.722.1, G.722.1C); and adaptive multi rate wide band plus (AMR-WB+) coding.

The apparatus may be further configured to generate the second scalable encoded layer by at least one of: advanced audio coding (AAC); MPEG-1 layer 3 (MP3), ITU-T embedded variable rate (EV-VBR) speech coding base line coding; adaptive multi rate-wide band (AMR-WB) coding; comfort noise generation (CNG) coding; and adaptive multi rate wide band plus (AMR-WB+) coding.

According to a second aspect of the invention there may be provided an apparatus for decoding a scalable encoded audio signal configured to: divide the scalable encoded audio signal into at least a first scalable encoded audio signal and a second scalable encoded audio signal; decode the first scalable encoded audio signal to generate a first audio signal comprising a greater portion of audio components from an audio source; and decode the second scalable encoded audio signal to generate a second audio signal comprising a lesser portion of audio components from an audio source.

The apparatus may be further configured to: output at least the first audio signal to a first speaker.

The apparatus may be further configured to generate at least a first combination of the first audio signal and the second audio signal and output the first combination to the first speaker.

The apparatus may be further configured to generate a further combination of the first audio signal and the second audio signal and output the second combination to a second speaker.

At least one of the first scalable encoded audio signal and the second scalable encoded audio signal may comprise at least one of: advanced audio coding (AAC); MPEG-1 layer 3 (MP3), ITU-T embedded variable rate (EV-VBR) speech coding base line coding; adaptive multi rate-wide band (AMR-WB) coding; ITU-T G.729.1 (G.722.1, G.722.1C); comfort noise generation (CNG) coding; and adaptive multi rate wide band plus (AMR-WB+) coding.

According to a third aspect of the invention there is provided a method for encoding an audio signal comprising: generating a first audio signal comprising a greater portion of audio components from an audio source; and generating a second audio signal comprising a lesser portion of audio components from an audio source.

The method may further comprise: receiving the greater portion of the audio components from the audio source from at least one microphone located or directed towards the audio source; and receiving the lesser portion of the audio components from the audio source from at least one further microphone located or directed away from the audio source.

The method may further comprise: generating a first scalable encoded signal layer from a first audio signal; generating a second scalable encoded signal layer from a second audio signal; and combining the first and second scalable encoded signal layers to form a third scalable encoded signal layer.

The method may further comprise generating the first scalable encoded layer by at least one of: advanced audio coding (AAC); MPEG-1 layer 3 (MP3), ITU-T embedded variable rate (EV-VBR) speech coding base line coding; adaptive multi rate-wide band (AMR-WB) coding; ITU-T G.729.1 (G.722.1, G.722.1C); and adaptive multi rate wide band plus (AMR-WB+) coding.

The method may further comprise generating the second scalable encoded layer by at least one of: advanced audio coding (AAC); MPEG-1 layer 3 (MP3), ITU-T embedded variable rate (EV-VBR) speech coding base line coding; adaptive multi rate-wide band (AMR-WB) coding; comfort noise generation (CNG) coding; and adaptive multi rate wide band plus (AMR-WB+) coding.

According to a fourth aspect of the invention there is provided a method for decoding a scalable encoded audio signal comprising: dividing the scalable encoded audio signal into at least a first scalable encoded audio signal and a second scalable encoded audio signal; decoding the first scalable encoded audio signal to generate a first audio signal comprising a greater portion of audio components from an audio source; and decoding the second scalable encoded audio signal to generate a second audio signal comprising a lesser portion of audio components from an audio source.

The method may further comprise: outputting at least the first audio signal to a first speaker.

The method may further comprise generating at least a first combination of the first audio signal and the second audio signal and output the first combination to the first speaker.

The method may further comprise generating a further combination of the first audio signal and the second audio signal and output the second combination to a second speaker.

The at least one of the first scalable encoded audio signal and the second scalable encoded audio signal may comprise at least one of: advanced audio coding (AAC); MPEG-1 layer 3 (MP3), ITU-T embedded variable rate (EV-VBR) speech coding base line coding; adaptive multi rate-wide band (AMR-WB) coding; ITU-T G.729.1 (G.722.1, G.722.1C); comfort noise generation (CNG) coding; and adaptive multi rate wide band plus (AMR-WB+) coding.

An encoder may comprise the apparatus as described above.

A decoder may comprise the apparatus as described above.

An electronic device may comprise the apparatus as described above.

A chipset may comprise the apparatus as described above.

According to a fifth aspect of the invention there is provided a computer program product configured to perform a method for encoding an audio signal comprising: generating a first audio signal comprising a greater portion of audio components from an audio source; and generating a second audio signal comprising a lesser portion of audio components from an audio source.

According to a sixth aspect of the invention there is provided a computer program product configured to perform a method for decoding a scalable encoded audio signal comprising: dividing the scalable encoded audio signal into at least a first scalable encoded audio signal and a second scalable encoded audio signal; decoding the first scalable encoded audio signal to generate a first audio signal comprising a greater portion of audio components from an audio source; and decoding the second scalable encoded audio signal to generate a second audio signal comprising a lesser portion of audio components from an audio source.

According to an seventh aspect of the invention there is provided an apparatus for encoding an audio signal comprising: means for generating a first audio signal comprising a greater portion of audio components from an audio source; and means for generating a second audio signal comprising a lesser portion of audio components from an audio source.

According to an eighth aspect of the invention there is provided an apparatus for decoding a scalable encoded audio signal comprising: means for dividing the scalable encoded audio signal into at least a first scalable encoded audio signal and a second scalable encoded audio signal; means for decoding the first scalable encoded audio signal to generate a first audio signal comprising a greater portion of audio components from an audio source; and means for decoding the second scalable encoded audio signal to generate a second audio signal comprising a lesser portion of audio components from an audio source.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
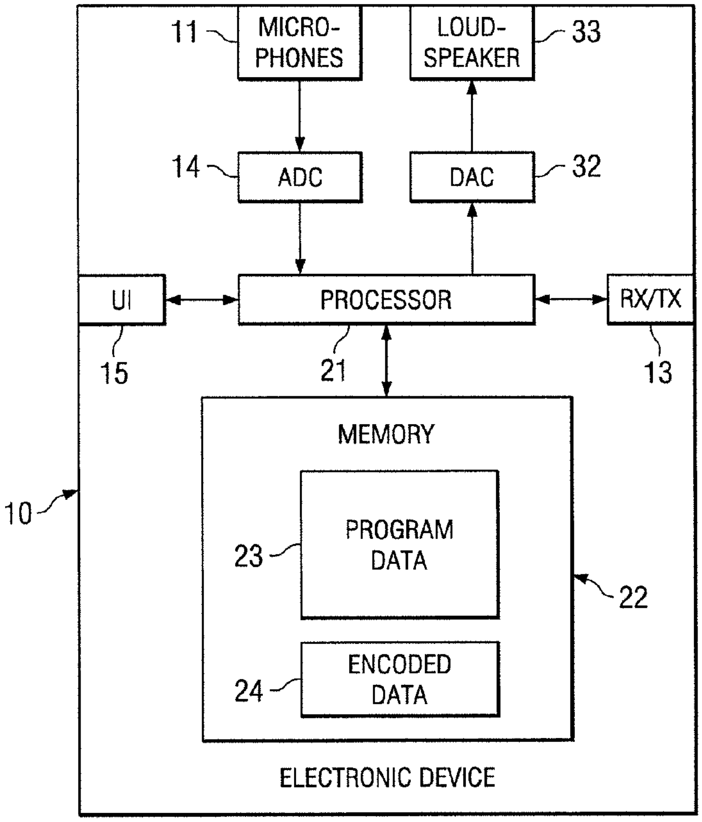
FIG. 1 shows schematically an electronic device employing embodiments of the invention.

The following describes in more detail possible mechanisms for the provision of a scalable audio coding system. In this regard reference is first made to FIG. 1 which shows a schematic block diagram of an exemplary electronic device 10, which may incorporate a codec according to an embodiment of the invention.

The electronic device 10 may for example be a mobile terminal or user equipment of a wireless communication system.

The electronic device 10 comprises a microphone 11, which is linked via an analogue-to-digital converter 14 to a processor 21. The processor 21 is further linked via a digital-to-analogue converter 32 to loudspeakers 33. The processor 21 is further linked to a transceiver (TX/RX) 13, to a user interface (UI) 15 and to a memory 22.

The processor 21 may be configured to execute various program codes. The implemented program codes comprise an audio encoding code for encoding a combined audio signal and code to extract and encode side information pertaining to the spatial information of the multiple channels. The implemented program codes 23 further comprise an audio decoding code. The implemented program codes 23 may be stored for example in the memory 22 for retrieval by the processor 21 whenever needed. The memory 22 could further provide a section 24 for storing data, for example data that has been encoded in accordance with the invention.

The encoding and decoding code may in embodiments of the invention be implemented in hardware or firmware.

The user interface 15 enables a user to input commands to the electronic device 10, for example via a keypad, and/or to obtain information from the electronic device 10, for example via a display. The transceiver 13 enables a communication with other electronic devices, for example via a wireless communication network.

It is to be understood again that the structure of the electronic device 10 could be supplemented and varied in many ways.

A user of the electronic device 10 may use the microphones 11 for inputting speech that is to be transmitted to some other electronic device or that is to be stored in the data section 24 of the memory 22. A corresponding application has been activated to this end by the user via the user interface 15. This application, which may be run by the processor 21, causes the processor 21 to execute the encoding code stored in the memory 22.

The analogue-to-digital converter 14 converts the input analogue audio signal into a digital audio signal and provides the digital audio signal to the processor 21.

The processor 21 may then process the digital audio signal in the same way as described with reference to FIGS. 3 and 4.

The resulting bit stream is provided to the transceiver 13 for transmission to another electronic device. Alternatively, the coded data could be stored in the data section 24 of the memory 22, for instance for a later transmission or for a later presentation by the same electronic device 10.

The electronic device 10 could also receive a bit stream with correspondingly encoded data from another electronic device via its transceiver 13. In this case, the processor 21 may execute the decoding program code stored in the memory 22. The processor 21 decodes the received data, and provides the decoded data to the digital-to-analogue converter 32. The digital-to-analogue converter 32 converts the digital decoded data into analogue audio data and outputs them via the loudspeakers 33. Execution of the decoding program code could be triggered as well by an application that has been called by the user via the user interface 15.

The received encoded data could also be stored instead of an immediate presentation via the loudspeaker(s) 33 in the data section 24 of the memory 22, for instance for enabling a later presentation or a forwarding to still another electronic device.

Figure 3:
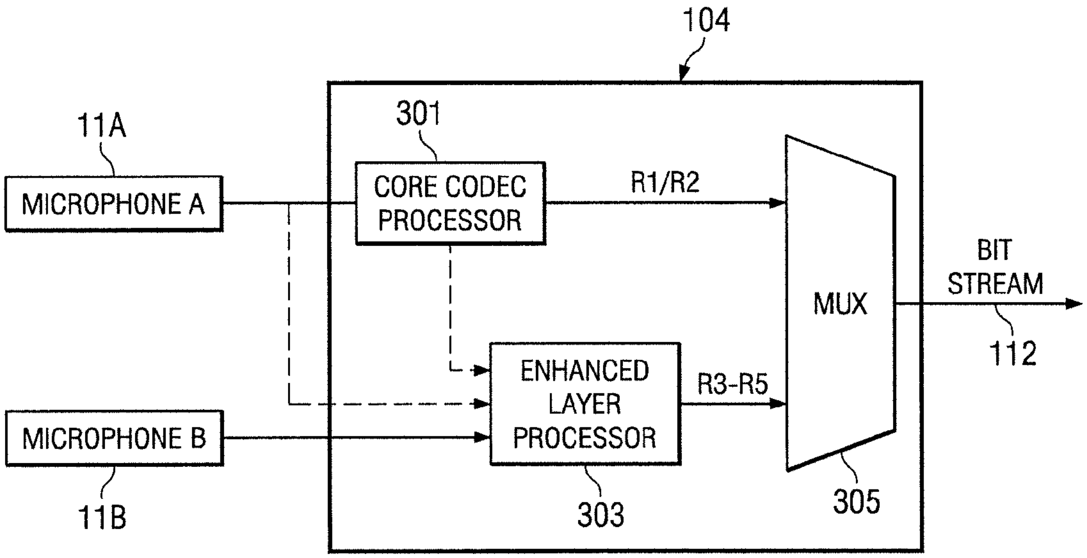
FIG. 3 shows schematically an encoder part of the audio codec system shown in FIG. 2.
Figure 4:
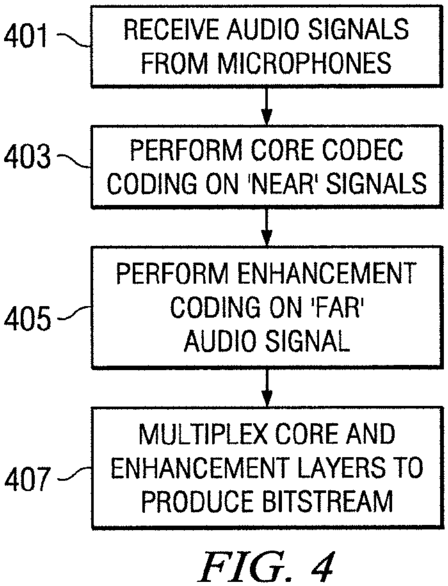
FIG. 4 shows schematically a flow diagram illustrating the operation of an embodiment of the audio encoder as shown in FIG. 3 according to the present invention.
Figure 5:
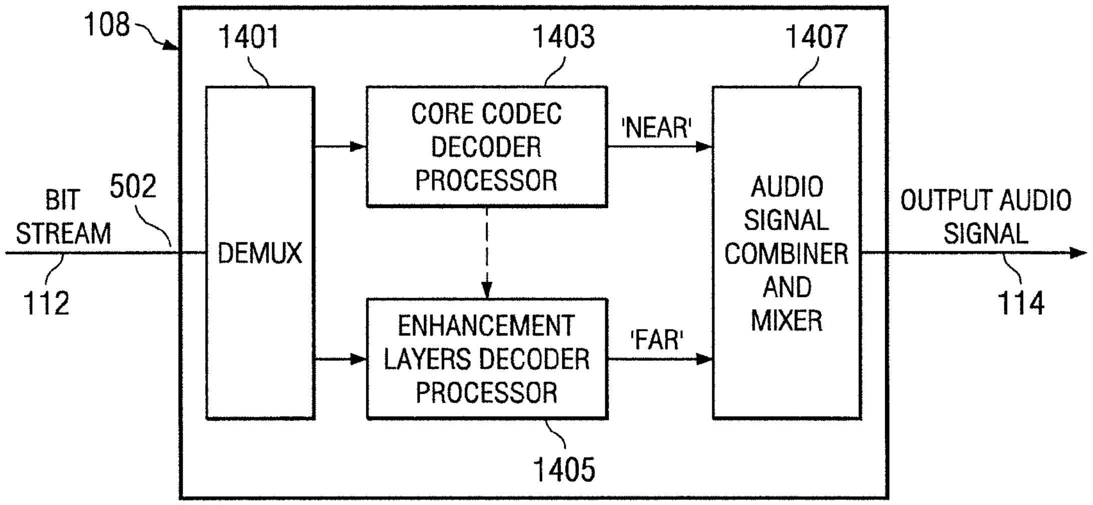
FIG. 5 shows a schematically a decoder part of the audio codec system shown in FIG. 2.
Figure 6:
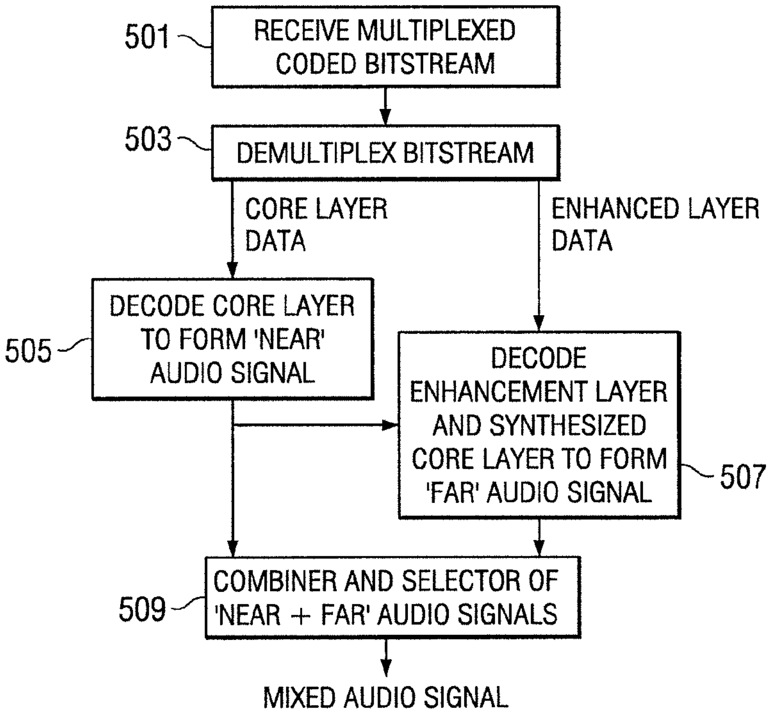
FIG. 6 shows a flow diagram illustrating the operation of an embodiment of the audio decoder as shown in FIG. 5 according to the present invention.

It would be appreciated that the schematic structures described in FIGS. 3 and 5 and the method steps in FIGS. 4 and 6 represent only a part of the operation of a complete audio codec as exemplarily shown implemented in the electronic device shown in FIG. 1.

Figure 7A:
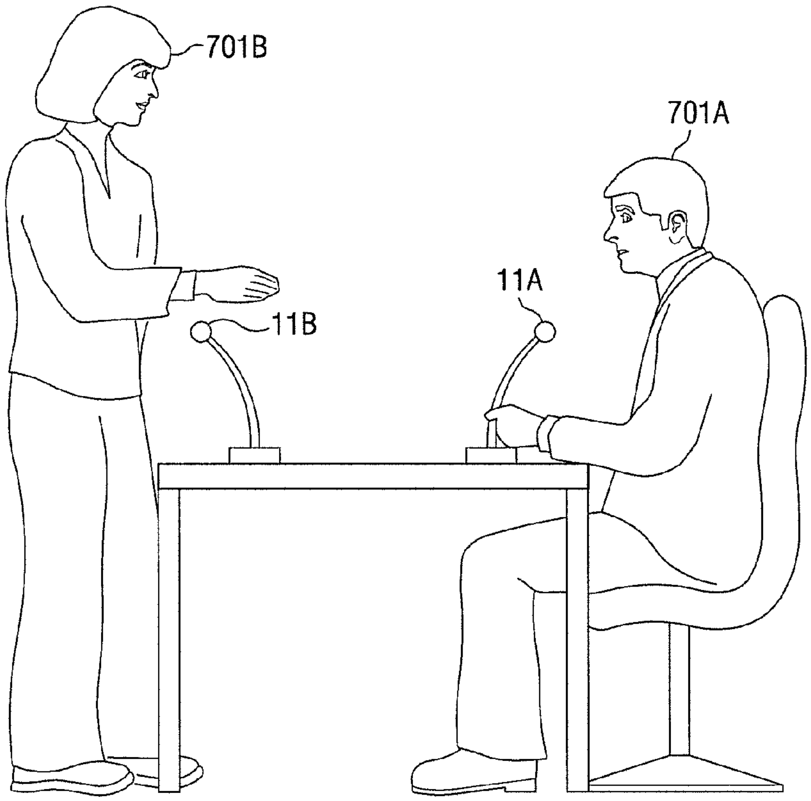
FIGS. 7*a* to 7*h* show possible microphone/speaker locations according to embodiments of the invention.
Figure 7B:
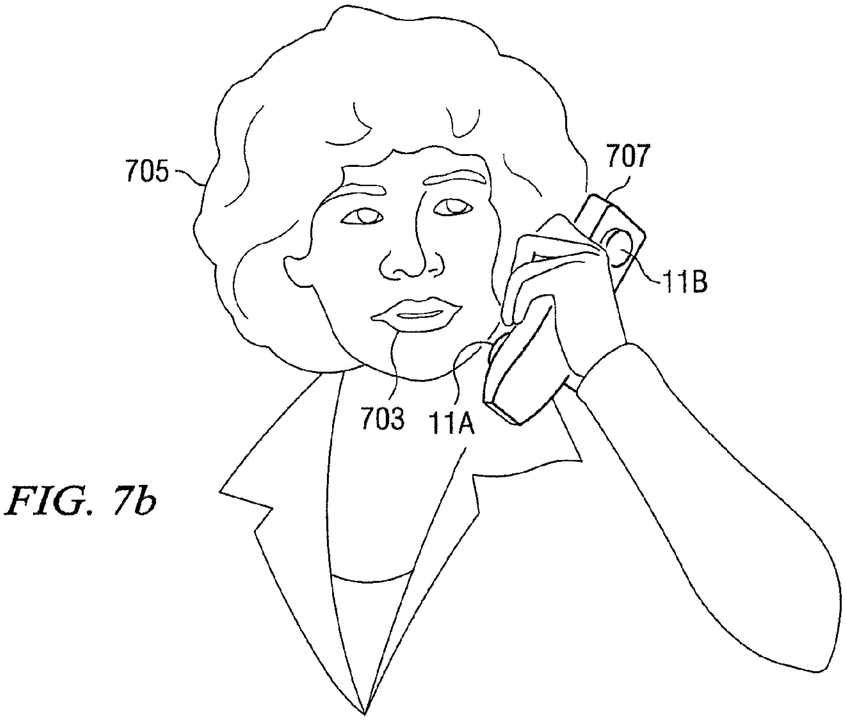

With respect to FIGS. 7*a* and 7*b*, examples of the microphone arrangements suitable for embodiments of the invention are shown. In FIG. 7*a*, an example arrangement of a first and second microphone 11*a* and 11*b* is shown. A first microphone 11*a* is located close to a first audio source, for example conference speaker 701*a*. The audio signals received from the first microphone 11*a* may be designated the "near" signal. A second microphone 11*b* is also shown located away from the audio source 701*a*. The audio signal received from the second microphone 11*b* may be defined as the "far" audio signal.

As would be clearly understood by the person skilled in the art, the difference between the positioning of the microphone in order to generate the "near" and "far" audio signals is one of relative difference from the audio source 701*a*. Thus for a second audio source, a further conference speaker 701*b*, the audio signal derived from the second microphone 11*b* would be the "near" audio signal whereas the audio signal derived from first microphone 11*a* would be considered the "far" audio.

With respect to FIG. 7*b*, an example of microphone placing to generate "near" and "far" audio signals for a typical mobile communications device can be shown. In such an arrangement, the microphone 11*a* generating the "near" audio signal is located close to the audio source 703 which would, for example, be at a location similar to a conventional mobile communications device microphone and thus close to the mouth of the mobile communication device user 705, whereas the second microphone 11*b* generating the "far" audio signal is located on the opposite side of the mobile communication device 707 and is configured to receive the audio signals from the surroundings, being shielded from picking up the direct audio path from the audio source 703 by the mobile communication device 707 itself.

Although we show in FIG. 7 a first microphone 11*a* and a second microphone 11*b*, it would be understood by the person skilled in the art that the "near" and "far" audio signals may be generated from any number of microphone sources.

For example, the "near" and "far" audio signals may be generated using a single microphone with directional elements. In this embodiment, it may be possible to generate a near signal using the microphone directional elements pointing towards the audio source and generate a "far" audio signal from the microphone directional elements pointing away from the audio source.

Furthermore, in other embodiments of the invention, it may be possible to use multiple microphones to generate the "near" and "far" audio signals. In these embodiments, there may be a pre-processing of the signals from the microphones to generate a "near" audio signal by mixing the audio signals received from microphone(s) near the audio source and a "far" audio signal by mixing the audio signals received from microphone(s) located or directed away from the audio source.

Although above and hereafter we have discussed the "near" and "far" signals as either being generated by microphones directly or being generated by pre-processing microphone generated signals, it would be appreciated that the "near" and "far" signals may be signals previously recorded/stored or received other than directly from the microphone/pre-processor.

Furthermore, although the above and hereafter we discuss an encoding and decoding of the "near" and "far" audio signals, it would be appreciated that there may be in embodiments of the invention more than two audio signals to be encoded. For example, in one embodiment there may be multiple "near" or multiple "far" audio signals. In other embodiments of the invention, there may be a prime "near" audio signal and multiple sub-prime "near" audio signals where the signal is derived from a location between the "near" and "far" audio signals.

For the discussion of the remainder of the invention, we will discuss the encoding and decoding for a two microphone/near and far channels encoding and decoding process.

Figure 7C:
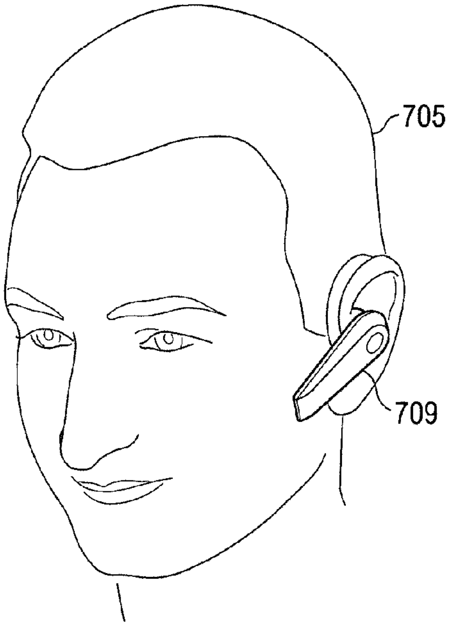
Figure 7D:
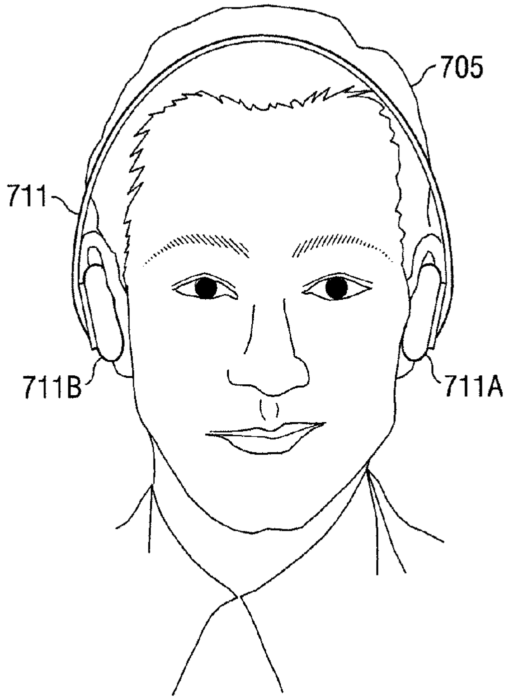

With respect to FIGS. 7*c* and 7*d*, examples of speaker arrangements suitable for embodiments of the invention are shown. In FIG. 7*c* a conventional or legacy mono speaker arrangement is shown. The user 705 has a speaker 709 located proximate to one of the ears of the user 705. In such an arrangement as shown in FIG. 7*c*, the single speaker 709 can provide the "near" signal to the preferred ear. In some embodiments of the invention, the single speaker 709 can provide the "near" signal plus a processed or filtered component of the "far" signal in order to add some "space" to the output signal.

In FIG. 7*d*, the user 705 is equipped with a headset 711 comprising a pair of speakers 711*a* and 711*b*. In such an arrangement, the first speaker 711*a* may output the "near" signal and the second speaker 711*b* may output the "far" signal.

In other embodiments of the invention the first speaker 711*a* and the second speaker 711*b* are both provided with a combination of the "near" and "far" signals.

In some embodiments of the invention, the first speaker 711*a* is provided with a combination of the "near" and "far" audio signals such that the first speaker711*a* receives a "near" signal and an $\alpha$ modified "far" audio signal. The second speaker 711*b* receives the "far" audio signal and a $\beta$ modified "near" audio signal. In this embodiment, the terms $\alpha$ and $\beta$ indicate that a filtering or processing has been carried out on the audio signal.

Figure 7E:
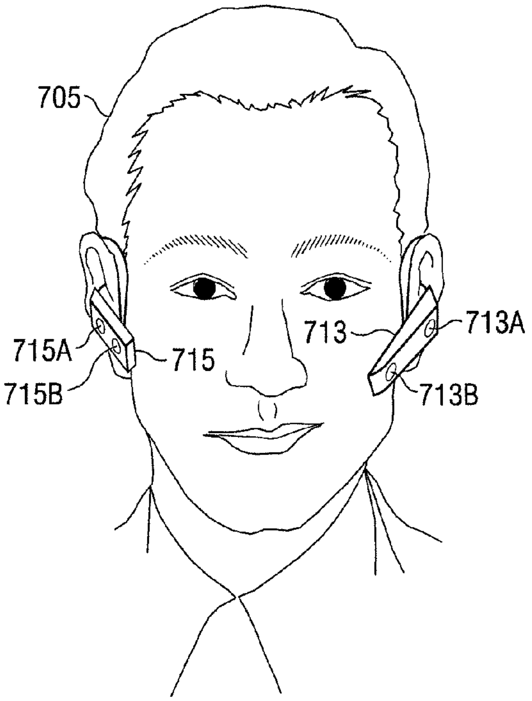

With respect of FIG. 7*e*, a further example of both a microphone and speaker arrangement suitable for embodiments of the invention is shown. In such an embodiment, the user 705 is equipped with a first handset/headset unit comprising a speaker 713*a* and microphone 713*b* which is located proximate to the preferred ear and the mouth respectively. The user 705 is further equipped with a further separate Bluetooth device 715 which is equipped with a separate Bluetooth device speaker 715*a* and separate Bluetooth device microphone 715*b*. The separate Bluetooth device 715 microphone 715*b* is configured so that it does not directly receive signals from the user 705 audio source, in other words the user 705 mouth. The arrangement of the headset speaker 713*a* and the separate Bluetooth device speaker 715*a* can be considered to be similar to the arrangement of the two speakers of the single headset 711 as shown in FIG. 7*d*.

Figure 7F:
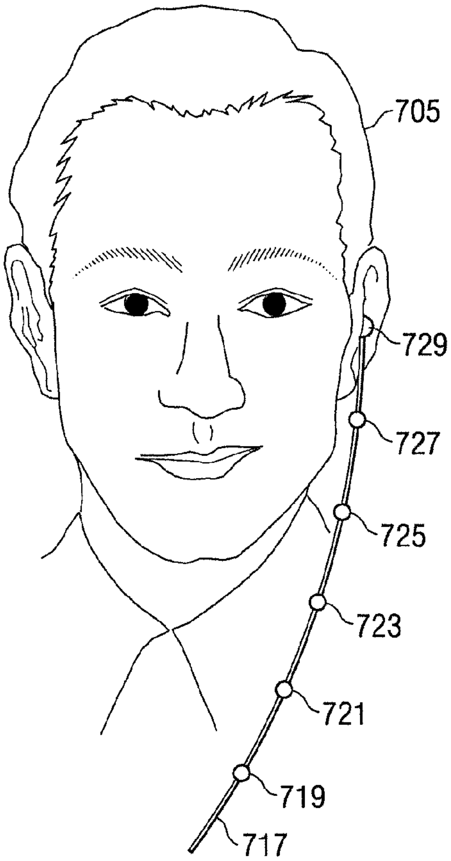

With respect to FIG. 7*f*, a further example of a microphone and speaker arrangement suitable for embodiments of the invention is also shown. In FIG. 7*f*, a cable which may or may not connect to the electronic device directly is shown. The cable 717 comprises a speaker 729 and several separate microphones. The microphones are arranged along the length of the cable to form a microphone array. Thus, a first microphone 727 is located close to the speaker 729, the second microphone 725 is located further along the cable 717 from the first microphone 727. The third microphone 723 is located further down the cable 717 from the second microphone 725. The fourth microphone 721 is located further down the cable 717 from the third microphone 723. The fifth microphone 719 is located further down the cable 717 from the fourth microphone 721. The spacing of the microphones may be in a linear or non linear configuration dependent on embodiments of the invention. In such an arrangement, the "near" signal may be formed by mixing from a combination of the audio signals received by the microphones nearest the mouth of the user 705. The "far" audio signal may be generated by mixing a combination of the audio signals received from the microphones furthest from the mouth of the user 705. As described above in some embodiments of the invention, each of the microphones may be used to generate a separate audio signal which is then processed as described in further detail below.

In these embodiments it would be appreciated by the person skilled in the art that the actual number of microphones is not important. Thus a multiplicity of microphones in any arrangement may be used in embodiments of the invention to capture the audio field and signal processing methods may be used to recover the "near" and "far" signals.

Figure 7G:
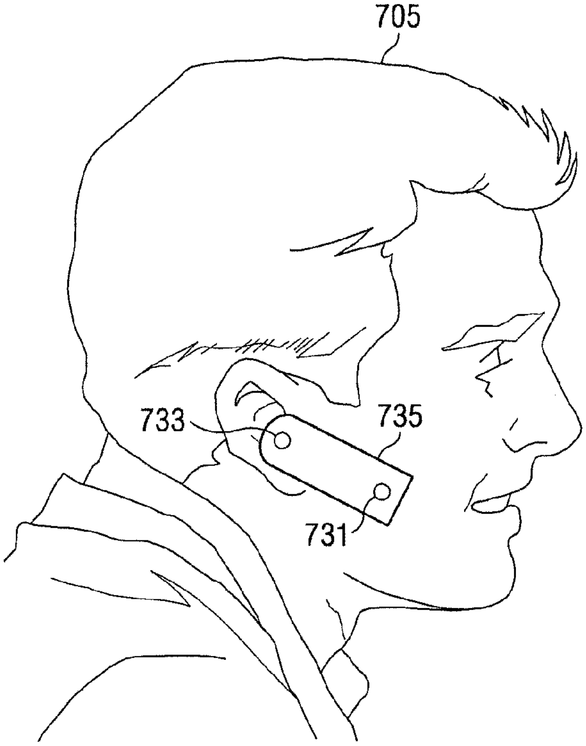

With respect to FIG. 7*g*, a further example of the microphone and speaker arrangement suitable for embodiments of the invention is shown. In FIG. 7*g*, a Bluetooth device is shown connected to the preferred ear of user 705. The Bluetooth device 735 comprises a “near” microphone 731 located proximate to the mouth of the user 705. The Bluetooth device 735 further comprises a “far” microphone 733 located distant relative to the proximate (near) microphone 731 location.

Figure 7H:
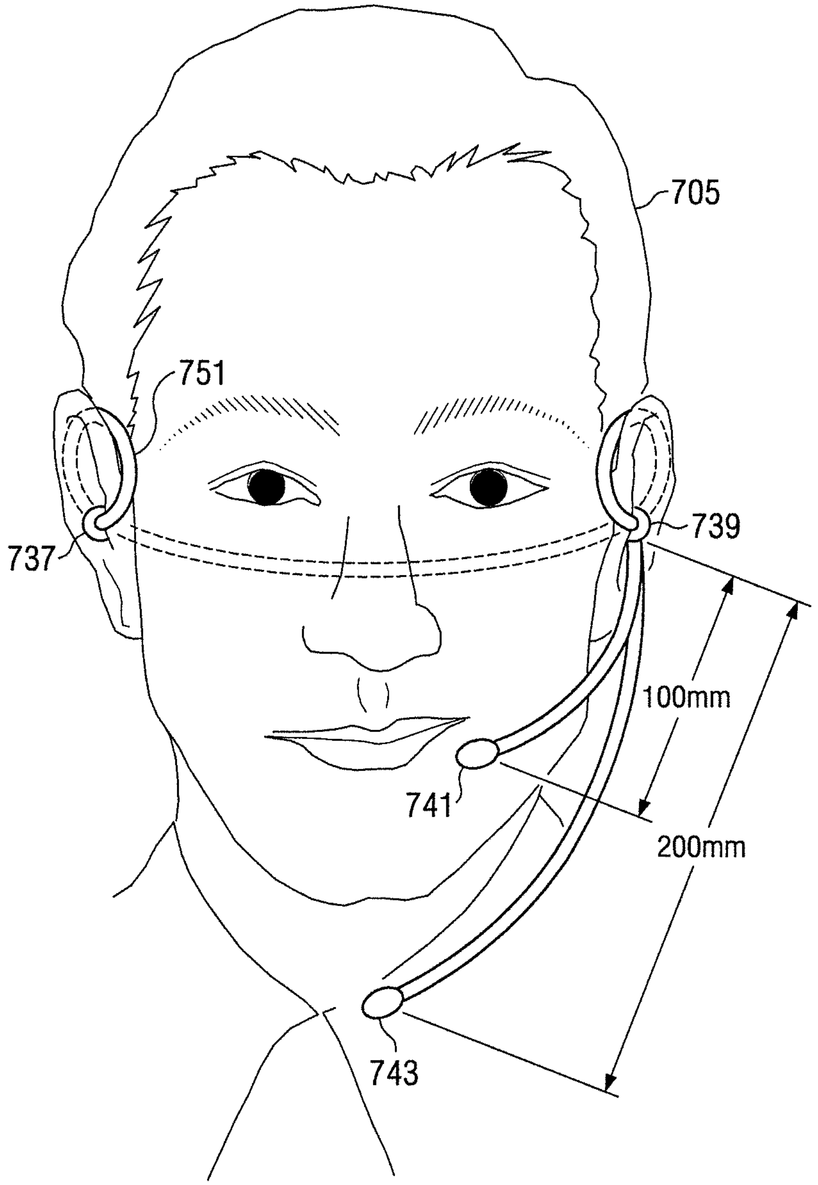

Furthermore with respect to FIG. 7*h*, an example of the microphone/speaker arrangement suitable for embodiments of the invention is shown. In FIG. 7*h*, the user 705 is configured to operate a headset 751. The headset comprises a binaural stereo headset with a first speaker 737 and a second speaker 739. The headset 751 is shown further with a pair of microphones. The first microphone 741, which is shown in FIG. 7*h* as being located 100 millimetres from the speaker 739 and a second microphone 743 located 200 millimetres from the speaker 739. In such an arrangement, the first speaker 737 and the second speaker 739 can be configured according to the playback arrangement described with respect to FIG. 7*d*.

Furthermore, the microphone arrangement of the first microphone 741 and the second microphone 743 can be configured so that the first microphone 741 is configured to receive or generate the “near” audio signal component and the second microphone 743 is configured to generate the “far” audio signal.

Figure 2:
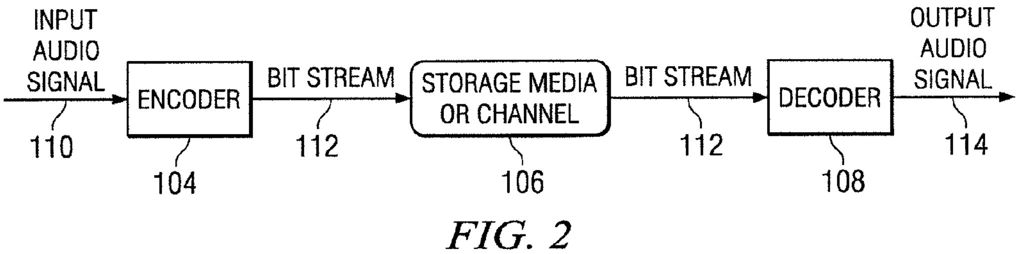
FIG. 2 shows schematically an audio codec system employing embodiments of the present invention.

The general operation of audio codecs as employed by embodiments of the invention is shown in FIG. 2. General audio coding/decoding systems consist of an encoder and a decoder, as illustrated schematically in FIG. 2. Illustrated is a system 102 with an encoder 104, a storage or media channel 106 and a decoder 108.

The encoder 104 compresses an input audio signal 110 producing a bit stream 112, which is either stored or transmitted through a media channel 106. The bit stream 112 can be received within the decoder 108. The decoder 108 decompresses the bit stream 112 and produces an output audio signal 114. The bit rate of the bit stream 112 and the quality of the output audio signal 114 in relation to the input signal 110 are the main features, which define the performance of the coding system 102.

FIG. 3 depicts schematically an encoder 104 according to an exemplary embodiment of the invention.

The encoder 104 comprises a core codec processor 301 which is configured to receive the “near” audio signal, for example, as shown in FIG. 3, the audio signal from microphone 11*a*. The core codec processor is further arranged to be connected to a multiplexer 305 and an enhanced layer processor 303.

The enhanced layer processor 303 is further configured to receive the “far” audio signal, which is shown in FIG. 3 to be the audio signal received from the microphone 11*b*. The enhanced layer processor is further configured to be connected to the multiplexer 305. The multiplexer 305 is configured to output the bit stream such as the bit stream 112 shown in FIG. 2.

The operation of these components is described in more detail with reference to the flow chart FIG. 4 showing the operation of the encoder 104.

The “near” and “far” audio signals are received by the encoder 104. In a first embodiment of the invention, the “near” and “far” audio signals are digitally sampled signals. In other embodiments of the present invention the “near” and “far” audio signals may be an analogue audio signal received from the microphones 11*a* and 11*b* which are analogue to digitally (A/D) converted. In further embodiments of the invention the audio signals are converted from a pulse code modulation (PCM) digital signal to an amplitude modulation (AM) digital signal. The receiving of the audio signals from the microphones is shown in FIG. 4 by step 401.

As has been shown above in some embodiments of the invention the “near” and “far” audio signals may be processed from a microphone array (which may comprise more than 2 microphones). The audio signals received from the microphone array, such as the array shown in FIG. 7*f*, may generate the “near” and “far” audio signals using signal processing methods such as beam-forming, speech enhancement, source tracking, noise suppression. Thus in embodiments of the invention the “near” audio signal generated is selected and determined so that it contains preferably (clean) speech signals (in other words the audio signal without too much noise) and the “far” audio signal generated is selected and determined so that it contains preferably the background noise components together with the speakers own voice echo from the surrounding environment.

The core codec processor 301 receives the “near” audio signal to be encoded and outputs the encoding parameters which represent the core level encoded signal. The core codec processor 301 may furthermore generate for internal use the synthesized “near” audio signal (in other words the “near” audio signal is encoded into parameters and then the parameters are decoded using the reciprocal process to produce a synthesized “near” audio signal).

The core codec processor 301 may use any appropriate encoding technique to generate the core layer.

In a first embodiment of the invention, the core codec processor 301 generates a core layer using an embedded variable bit rate codec (EB-VBR).

In other embodiments of the invention the core codec processor may be an algebraic code excited linear prediction encoding (ACELP) and is configured to output a bit stream of typical ACELP parameters.

It is to be understood that embodiments of the present invention could equally use any audio or speech based codec to represent the core layer.

The generation of the core layer encoded signal is shown in FIG. 4 by step 403. The core layer encoded signal is passed from the core codec processor 301 to the multiplexer 305.

The enhanced layer processor 303 receives the “far” audio signal and from the “far” audio signal generates the enhanced layer outputs. In some embodiments of the invention, the enhanced layer processor performs a similar encoding on the “far” audio signal as is performed by the core codec processor 301 on the “near” audio signal. In other embodiments of the invention, the “far” audio signal is encoded using any suitable encoding method. For example, the “far” audio signal may be encoded using such similar schemes as used in discontinuous transmission (DTX), where comfort noise generation (CNG) codec is used in low bit rate layers, algebraic code excited linear prediction encoding (ACELP) and modified discrete cosine transform (MDCT) residual encoding methods may be used for mid and high bit rate capacity encoders. In some embodiments of the invention the quantization of the “far”-signal may be also specifically chosen to suit the signal type.

In some embodiments of the invention, the enhanced layer processor is configured to receive the synthesized “near” audio signal and the “far” audio signal. The enhanced layer processor 303 may in embodiments of the invention generate an encoded bit stream, also known as an enhancement layer dependent on the “far” audio signal and the synthesized “near” audio signal. For example, in one embodiment of the invention, the enhanced layer processor subtracts the synthesized “near” signal from the “far” audio signal and then encodes the difference audio signal, for example by performing a time to frequency domain conversion and encoding the frequency domain output as the enhanced layer.

In other embodiments of the invention, the enhanced layer processor 303 is configured to receive the "far" audio signal, the synthesized "near" audio signal and the "near" audio signal and generate an enhanced layer bit stream dependent on a combination of the three inputs.

Thus the apparatus for encoding an audio signal can in embodiments of the invention be configured to generate a first scalable encoded signal layer from a first audio signal, generate a second scalable encoded signal layer from a second audio signal, and combine the first and second scalable encoded signal layers to form a third scalable encoded signal layer.

The apparatus may in embodiments be further configured to generate the first audio signal comprising a greater portion of the audio components from an audio source, and to generate the second audio signal comprising a lesser portion of the audio components from the audio source.

The apparatus may in embodiments be further configured to receive the greater portion of the audio components from the audio source from at least one microphone located or directed towards the audio source, and to receive the lesser portion of the audio components from the audio source from at least one further microphone located or directed away from the audio source.

For example, in some embodiments of the invention at least a part of the enhanced layer bit stream output is generated dependent on the synthesized "near" audio signal and the "near" audio signal and a part of the enhanced layer bit stream output is dependent only on the "far" audio signal. In this embodiment, the enhanced layer processor 303 performs a similar core codec processing of the "far" audio signal to generate a "far" encoded layer similar to that produced by the core codec processor 301 on the "near" audio signal but for the "far" audio signal part.

In further embodiments of the invention the "near" synthesized signal and the "far" audio signal are transformed into the frequency domain and the difference between the two frequency domain signals is then encoded to produce the enhancement layer data.

In embodiments of the invention using frequency band encoding the time to frequency domain transform may be any suitable converter, such as discrete cosine transform (DCT), discrete fourier transform (DFT), fast fourier transform (FFT).

In some embodiments of the invention, ITU-T embedded variable bit rate (EV-VBR) speech/audio codec enhancement layers and ITU-T scaleable video codec (SVC) enhancement layers may be generated.

Further embodiments may include but are not limited to generating enhancement layers using variable multi-rate wideband (VMR-WB), ITU-T G.729, ITU-T G.729.1, ITU-T G.722.1, ITU G.722.1C, adaptive multi-rate wideband (AMR-WB), and adaptive multi-rate-wideband+ (AMR-WB+) coding schemes.

In other embodiments of the invention, any suitable layer codec may be employed to extract the correlation between the synthesized "near" signal and the "far" signal to generate an advantageously encoded enhanced layer data signal.

The generation of the enhancement layer is shown in FIG. 4 by step 405.

The enhancement layer data is passed from the enhancement layer processor 303 to the multiplexer 305.

The multiplexer 305 then multiplexes the core layer received from the core codec processor 301 and the enhanced layer or layers from the enhanced layer processor 303 to form the encoded signal bit stream 112. The multiplexing for the core and enhancement layers to produce the bit stream is shown in FIG. 4 by step 407.

To further assist the understanding of the invention the operation of the decoder 108 with respect to the embodiments of the invention is shown with respect to the decoder schematically shown in FIG. 5 and the flow chart showing the operation of the decoder in FIG. 6.

The decoder 108 comprises an input 502 from which the encoded bit stream 112 may be received. The input 502 is connected to the bit receiver/de-multiplexer 1401. The de-multiplexer 1401 is configured to strip the core and enhancement layer(s) from the bit-stream 112. The core layer data is passed from the de-multiplexer 1401 to the core codec decoder processor 1403 and the enhancement layer data is passed from the de-multiplexer 1401 to the enhancement layer decoder processor 1405.

Furthermore the core codec decoder processor 1403 is connected to the audio signal combiner and mixer 1407 and the enhancement layer decoder processor 1405.

The enhancement layer decoder processor 1405 is connected to the audio signal combiner and mixer 1407. The output of the audio signal combiner and mixer 1407 is connected to the output audio signal 114.

The receipt of the multiplex coded bit stream is shown in FIG. 6 by step 501.

The decoding of the bit stream and the separation into the core layer data and enhanced layer data is shown in FIG. 6 by step 503.

The core codec decoder processor 1403 performs a reciprocal process to the core codec processor 301 as shown in the encoder 104 in order to generate a synthesized "near" audio signal. This is passed from the core codec decoder processor 1403 to the audio signal combiner and mixer 1407.

Furthermore in some embodiments of the invention the synthesized "near" audio signal is passed also to the enhancement layer decoder processor 1405.

The decoding the core layer to form the synthesized "near" audio signal is shown in FIG. 6 by step 505.

The enhancement layer decoder processor 1405 receives at least the enhancement layer signals from the de-multiplexer 1401. Furthermore in some embodiments of the invention, the enhancement layer decoder processor 1405 receives the synthesized "near" audio signal from the core codec decoder processor 1403. Furthermore in some embodiments of the invention, the enhancement layer decoder processor 1405 receives both the synthesized "near" audio signal from the core codec decoder processor 1403 and some decoded parameters of the core layer.

The enhancement layer decoder processor 1405 then performs the reciprocal process to that generated within the enhanced layer processor 303 of the encoder 104 in order to generate at least the "far" audio signal.

In some embodiments of the invention the enhancement layer decoder processor 1405 may further produce additional audio components for the "near" audio signal. The production of the "far" audio signal from the decoding of the enhancement layer (and in some embodiments the synthesized core layer) is shown in FIG. 6 by step 507.

The "far" audio signal from the enhanced layer decoder processor is passed to the audio signal combiner and mixer 1407.

The audio signal combiner and mixer 1407 on receiving the synthesized "near" audio signal and the decoded "far" audio signal then produces a combined and/or selected combination of the two received signals and outputs a mixed audio signal on the output audio signal output.

In some embodiments of the invention, the audio signal combiner and mixer receives further information from either the input bit stream via the de-multiplexer 1401 or has previous knowledge on the placement of the microphones used to generate the "near" and "far" audio signals to digitally signal process the synthesized "near" and decoded "far" audio signals with respect to the position of speakers or headphone location for the listener in order to create the correct or advantageous sounding combination of the "near" and "far" audio signals.

In some embodiments of the invention the audio signal combiner and mixer may output only the "near" audio signal. In such a embodiment it would produce the audio signal similar to a legacy mono encoding/decoding and would therefore produce results which would be backwards compatible with present audio signals.

In some embodiments of the invention the "near" and "far" signals are both decoded from the bit stream and an amount of the "far" signal is mixed to the "near" signal in order to obtain pleasant sounding mono aural auditory background. In such embodiment of the invention, it would be possible for the listener to be aware of the environment of the audio source without disturbing the understanding of the audio source. This will also allow the receiving person to adjust the amount of "environment" to suit his/hers preference.

The use of the "near" and "far" signals produces an output which is more stable than the conventional binaural process and is less affected by a motion of the audio source. Furthermore in embodiments of the invention there is a further advantage of not requiring the encoder to be connected to multiple microphones in order to produce pleasant listening experiences.

Thus from the above it is clear that in embodiments of the invention the apparatus for decoding a scalable encoded audio signal is configured to divide the scalable encoded audio signal into at least a first scalable encoded audio signal and a second scalable encoded audio signal. The apparatus furthermore is configured to decode the first scalable encoded audio signal to generate a first audio signal. The apparatus also is configured to decode the second scalable encoded audio signal to generate a second audio signal.

Furthermore in embodiments of the invention the apparatus may be further configured to: output at least the first audio signal to a first speaker.

As described above in some embodiments the apparatus may be further configured to generate at least a first combination of the first audio signal and the second audio signal and output the first combination to the first speaker.

The apparatus may be further configured in other embodiments to generate a further combination of the first audio signal and the second audio signal and output the second combination to a second speaker.

It is to be understood that even though the present invention has been exemplary described in terms of a core layer and single enhancement layer, it is to be understood that the present invention may be applied to further enhancement layers.

The embodiments of the invention described above describe the codec in terms of separate encoders 104 and decoders 108 apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some/or all common elements.

As mentioned previously although the above process describes a single core audio encoded signal and a single enhancement layer audio encoded signal the same approach may be applied to synchronize and two media streams using the same or similar packet transmission protocols.

Although the above examples describe embodiments of the invention operating within a codec within an electronic device 610, it would be appreciated that the invention as described below may be implemented as part of any variable rate/adaptive rate audio (or speech) codec. Thus, for example, embodiments of the invention may be implemented in an audio codec which may implement audio coding over fixed or wired communication paths.

Thus user equipment may comprise an audio codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus at least to:

receive audio components from at least one microphone located at or directed to an audio source;

receive audio components from at least one further microphone, wherein either the further microphone is located at a position further away from the audio source than the position of the at least one microphone or the further microphone is directed away from the audio source, and wherein the audio components received from the at least one further microphone comprise fewer audio components of the audio source than the audio components of the audio source received from the at least one microphone;

generate a first scalable encoded signal layer from only the audio components received from the at least one microphone located at or directed to the audio source; and generate a second scalable encoded signal layer from the audio components received from the at least one further microphone and the audio components received from the at least one microphone.

2. The apparatus as claimed in claim 1, wherein the at least one memory and the computer program code are further configured to, with the at least one processor, cause the apparatus at least to:

combine the first and second scalable encoded signal layers to form a third scalable encoded signal layer.

3. The apparatus as claimed in claims 1, wherein the at least one memory and the computer program code are further configured to, with the at least one processor, cause the apparatus at least to:

generate the first scalable encoded layer by at least one of:

advanced audio coding (AAC);

MPEG-1 layer 3 (MP3), ITU-T embedded variable rate (EV-VBR) speech coding base line coding;

adaptive multi rate-wide band (AMR-WB) coding;

ITU-T G.729.1 (G.722.1, G.722.1C); and adaptive multi rate wide band plus (AMR-WB+) coding.

4. The apparatus as claimed in claims 1, wherein the at least one memory and the computer program code are further configured to, with the at least one processor, cause the apparatus at least to:

generate the second scalable encoded layer by at least one of:

advanced audio coding (AAC);

MPEG-1 layer 3 (MP3), ITU-T embedded variable rate (EV-VBR) speech coding base line coding;

adaptive multi rate-wide band (AMR-WB) coding;

comfort noise generation (CNG) coding; and adaptive multi rate wide band plus (AMR-WB+) coding.

5. An apparatus comprising at least one processor and at least one memory including computer program code, the at least one memory and the computer program code configured to, with the at least one processor, cause the apparatus at least to:

divide a multiplexed coded bistream into at least first scalable encoded audio signal layer data and second scalable encoded audio signal layer data;

decode the first scalable encoded audio signal layer data to generate a first audio signal comprising audio components from at least one microphone located at or directed to an audio source; and decode the second scalable encoded audio signal layer data using the audio components from the at least one microphone located at or directed to the audio source to generate a second audio signal comprising fewer audio components from the audio source than the number of audio components from the audio source of the first audio signal, wherein the fewer audio components are either from a further microphone located at a position further away from the audio source than the position of the at least one microphone or from a further microphone that is directed away from the audio source.

6. The apparatus as claimed in claim 5, wherein the at least one memory and the computer program code are further configured to, with the at least one processor, cause the apparatus at least to:

output at least the first audio signal to a first speaker.

7. The apparatus as claimed in claims 5, wherein the at least one memory and the computer program code are further configured to, with the at least one processor, cause the apparatus at least to:

generate at least a first combination of the first audio signal and the second audio signal and output the first combination to the first speaker.

8. The apparatus as claimed in claim 7, wherein the at least one memory and the computer program code are further configured to, with the at least one processor, cause the apparatus at least to:

generate a further combination of the first audio signal and the second audio signal and output the second combination to a second speaker.

9. The apparatus as claimed in claims 5 wherein at least one of the first scalable encoded audio signal and the second scalable encoded audio signal comprises at least one of:

advanced audio coding (AAC);

MPEG-1 layer 3 (MP3), ITU-T embedded variable rate (EV-VBR) speech coding base line coding;

adaptive multi rate-wide band (AMR-WB) coding;

ITU-T G.729.1 (G.722.1, G.722.1C);

comfort noise generation (CNG) coding; and adaptive multi rate wide band plus (AMR-WB+) coding.

10. A method comprising:

receiving audio components from at least one microphone located at or directed to an audio source;

receiving audio components from at least one further microphone, wherein either the further microphone is located at a position further away from the audio source than the position of the at least one microphone or the further microphone is directed away from the audio source, and wherein the audio components received from the at least one further microphone comprise fewer audio components of the audio source than the audio components of the audio source received from the at least one microphone;

generating a first scalable encoded signal layer from only the audio components received from the at least one microphone located at or directed to the audio source; and generating a second scalable encoded signal layer from the audio components received from the at least one further microphone and the audio components received from the at least one microphone.

11. The method as claimed in claim 10, further comprising:

generating a first scalable encoded signal layer from the first audio signal;

generating a second scalable encoded signal layer from the second audio signal; and combining the first and second scalable encoded signal layers to form a third scalable encoded signal layer.

12. The method as claimed in claims 10 further comprising generating the first scalable encoded layer by at least one of:

advanced audio coding (AAC);

MPEG-1 layer 3 (MP3), ITU-T embedded variable rate (EV-VBR) speech coding base line coding;

adaptive multi rate-wide band (AMR-WB) coding;

ITU-T G.729.1 (G.722.1, G.722.1C); and adaptive multi rate wide band plus (AMR-WB+) coding.

13. The method as claimed in claims 10 further comprising generating the second scalable encoded layer by at least one of:

advanced audio coding (AAC);

MPEG-1 layer 3 (MP3), ITU-T embedded variable rate (EV-VBR) speech coding base line coding;

adaptive multi rate-wide band (AMR-WB) coding;

comfort noise generation (CNG) coding; and adaptive multi rate wide band plus (AMR-WB+) coding.

14. A method comprising:

dividing a multiplexed coded bistream into at least first scalable encoded audio signal layer data and second scalable encoded audio signal layer data;

decoding the first scalable encoded audio signal layer data to generate a first audio signal comprising audio components from at least one microphone located at or directed to an audio source; and decoding the second scalable encoded audio signal layer data using the audio components from the at least one microphone located at or directed to the audio source to generate a second audio signal comprising fewer audio components from the audio source than the number of audio components from the audio source of the first audio signal, wherein the fewer audio components are either from a further microphone located at a position further away from the audio source than the position of the at least one microphone or from a further microphone that is directed away from the audio source.

15. The method as claimed in claim 14, further comprising:

outputting at least the first audio signal to a first speaker.

16. The method as claimed in claims 14, further comprising generating at least a first combination of the first audio signal and the second audio signal and output the first combination to the first speaker.

17. The method as claimed in claim 16, further comprising generating a further combination of the first audio signal and the second audio signal and output the second combination to a second speaker.

18. The method as claimed in claims 14 wherein at least one of the first scalable encoded audio signal and the second scalable encoded audio signal comprises at least one of:

advanced audio coding (AAC);

MPEG-1 layer 3 (MP3), ITU-T embedded variable rate (EV-VBR) speech coding base line coding;

adaptive multi rate-wide band (AMR-WB) coding;

ITU-T G.729.1 (G.722.1, G.722.1C);

comfort noise generation (CNG) coding; and adaptive multi rate wide band plus (AMR-WB+) coding.

19. A non-transitory computer program product comprising computer readable medium bearing computer program code embodied therein for use with a computer, the computer program code comprising instructions operable to cause a processor to:

receive audio components from at least one microphone located at or directed to an audio source;

receive audio components from at least one further microphone, wherein either the further microphone is located at a position further away from the audio source than the position of the at least one microphone or the further microphone is directed away from the audio source, and wherein the audio components received from the at least one further microphone comprise fewer audio components of the audio source than the audio components of the audio source received from the at least one microphone;

generate a first scalable encoded signal layer from only the audio components received from the at least one microphone located at or directed to the audio source; and generate a second scalable encoded signal layer from the audio components received from the at least one further microphone and the audio components received from the at least one microphone.

20. A non-transitory computer program product comprising computer readable medium bearing computer program code embodied therein for use with a computer, the computer program code comprising instructions operable to cause a processor to:

divide a multiplexed coded bistream into at least first scalable encoded audio signal layer data and second scalable encoded audio signal layer data;

decode the first scalable encoded audio signal layer data to generate a first audio signal comprising audio components from at least one microphone located at or directed to an audio source; and decode the second scalable encoded audio signal layer data using the audio components from the at least one microphone located at or directed to the audio source to generate a second audio signal comprising fewer audio components from the audio source than the number of audio components from the audio source of the first audio signal, wherein the fewer audio components are either from a further microphone located at a position further away from the audio source than the position of the at least one microphone or from a further microphone that is directed away from the audio source.

* * * * *